US012695660B2

(12) United States Patent
Zanzi et al.

(10) Patent No.: US 12,695,660 B2
(45) Date of Patent: Jul. 28, 2026

(54) SYSTEM AND METHOD FOR AUTONOMOUS POLICY CONFLICT DETECTION AND MITIGATION IN OPEN RADIO ACCESS NETWORK (O-RAN) DEPLOYMENTS

(71) Applicant: NEC Laboratories Europe GmbH, Heidelberg (DE)

(72) Inventors: Lanfranco Zanzi, Heidelberg (DE); Francesco Devoti, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 18/860,711

(22) PCT Filed: Aug. 4, 2022

(86) PCT No.: PCT/EP2022/072000
§ 371 (c)(1),
(2) Date: Oct. 28, 2024

(87) PCT Pub. No.: WO2023/213422
PCT Pub. Date: Nov. 9, 2023

(65) Prior Publication Data
US 2025/0373484 A1    Dec. 4, 2025

(30) Foreign Application Priority Data
May 6, 2022    (EP) ..................................... 22172122

(51) Int. Cl.
*H04L 41/0631*    (2022.01)
*H04L 41/042*    (2022.01)
(52) U.S. Cl.
CPC .......... *H04L 41/065* (2013.01); *H04L 41/042* (2013.01)
(58) Field of Classification Search
CPC ............................ H04L 41/065; H04L 41/042
See application file for complete search history.

(56) References Cited

U.S. PATENT DOCUMENTS

2006/0184616 A1 *  8/2006  Park ........................ H04L 67/63
709/203
2017/0206351 A1 *  7/2017  Jay ...................... H04W 12/088
(Continued)

FOREIGN PATENT DOCUMENTS

WO    WO 2022046087 A1    3/2022

OTHER PUBLICATIONS

Zambianco, Marco et al, "Intelligent multi-branch allocation of spectrum slices for inter-numerology interference minimization", Jun. 24, 2021 (Jun. 24, 2021), Computer Networks 196, XP086723673, Elsevier B.V., Netherlands, pp. 1-14.
(Continued)

*Primary Examiner* — Viet D Vu
(74) *Attorney, Agent, or Firm* — Leydig, Voit & Mayer, Ltd.

(57)    ABSTRACT

A method for detecting and managing conflicting interactions among agents operating on a shared open radio environment includes evaluating effects of monitored actions taken by agents on one or more observed metrics, the actions taken by agents being observed by a monitoring system of the shared open radio environment. The monitored actions and information that is collected about the agents from the monitoring system is used to build a knowledge graph that represents interactions between each agent of the set of agents with the shared open radio environment and the agents. Information extracted from the knowledge graph is processed to estimate unknown and/or dynamic relationships among the agents. The estimated relationships among the agents is used to detect conflicting situations between the agents, and a predefined coordination and/or control policy is enforced according to the estimated relationships among the agents to solve the detected conflicting situations.

15 Claims, 8 Drawing Sheets

100

(56)               References Cited

U.S. PATENT DOCUMENTS

| | | |
|---|---|---|
| 2022/0038902 A1 | 2/2022 | Mueck |
| 2024/0196236 A1* | 6/2024 | Chou ................... H04W 24/02 |
| 2024/0205084 A1* | 6/2024 | Subramanya ......... H04W 24/02 |
| 2024/0249199 A1* | 7/2024 | Jeong .................. G06N 3/0464 |

OTHER PUBLICATIONS

ITU-T, "ITU-T Rec. M.3400 (Feb. 2000) TMN management functions", ITU-T Draft ; Study Period 2013-2016, International Telecommunication Union, Geneva; CH, Nov. 13, 2015 (Nov. 13, 2015), pp. 1-110, XP044142347.
Bonati, Leonardo et al, "SCOPE an open and softwarized prototyping platform for NextG systems", Proceedings of the 19th ACM International Conference on Mobile Systems Applications and Services, ACM, New York, USA, Jun. 24, 2021 (Jun. 24, 2021), pp. 415-426, XP058761996.

* cited by examiner

SYSTEM AND METHOD FOR AUTONOMOUS POLICY CONFLICT DETECTION AND MITIGATION IN OPEN RADIO ACCESS NETWORK (O-RAN) DEPLOYMENTS

CROSS REFERENCE TO RELATED APPLICATIONS

This application is a U.S. National Phase application under 35 U.S.C. § 371 of International Application No. PCT/EP2022/072000, filed on Aug. 4, 2022, and claims benefit to European Patent Application No. EP 22172122.8, filed on May 6, 2022. The International Application was published in English on Nov. 9, 2023 as WO 2023/213422 A1 under PCT Article 21(2).

FIELD

The present invention relates to a method and an agent coordinator for detecting and managing conflicting interactions among a set of agents operating on a shared open radio environment.

BACKGROUND

The wide range of heterogeneous applications and use cases emerging for mobile communication translates into the need for a flexible platform capable of providing the required quality of service with affordable CAPEX and OPEX.

This led to the definition of open and flexible radio access network platforms capable of supporting the coexistence of a high number of heterogeneous applications in the same shared environment. Following this trend, O-RAN (Open-Radio Access Network) has recently introduced the concept of x-application (xApp) which is a logical entity running third-party (potentially ML-based) arbitrary applications with network and control capabilities onto the open platform through standardized interfaces. Since xApps are envisioned to support Machine Learning-based logic to automate decision making processes, the terms agent and xApp will sometimes be used interchangeably within the present disclosure.

Multiple xApps pursuing different tasks with different objectives can be deployed on the same network and thus access the same shared resources, potentially leading to conflicts (for reference, see Marcin Dryjanski, Łukasz Kułacz, and Adrian Kliks: "Toward Modular and Flexible Open RAN Implementations in 6G Networks: Traffic Steering Use Case and O-RAN xApps", in Sensors 2021, 21, 8173. https://doi.org/10.3390/s21248173). At the same time, conflicts mitigation techniques compliant with the arbitrary nature of the xApps are missing.

Salvatore D'Oro et al.: "OrchestRAN: Network Automation through Orchestrated Intelligence in the Open RAN", in IEEE International Conference on Computer Communications (INFOCOM) 2022, arXiv:2201.05632v1 [cs.NI], 14 Jan. 2022 discloses RAN architecture where the network functionalities are represented by nodes in a graph. Further, xapps are disclosed that perform control operations like load balancing, handover procedures, scheduling and RAN slicing policies over the RAN elements. However, conflicts mitigation techniques regarding decision actions of the xapps are not disclosed.

SUMMARY

In an embodiment, the present disclosure provides a computer-implemented method for detecting and managing conflicting interactions among a set of agents operating on a shared open radio environment, the method comprising: evaluating effects of monitored actions taken by the agents on one or more observed metrics, the actions taken by the agents being observed by a monitoring system of the shared open radio environment; using the monitored actions and information that is collected about the agents from the monitoring system to build a knowledge graph that represents the interactions between each agent of the set of agents with the shared open radio environment and between the agents; processing information extracted from the knowledge graph to estimate unknown and/or dynamic relationships among the agents; using the estimated relationships among the agents to detect conflicting situations between the agents; and enforcing a predefined coordination and/or control policy according to the estimated relationships among the agents to solve or mitigate the detected conflicting situations.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
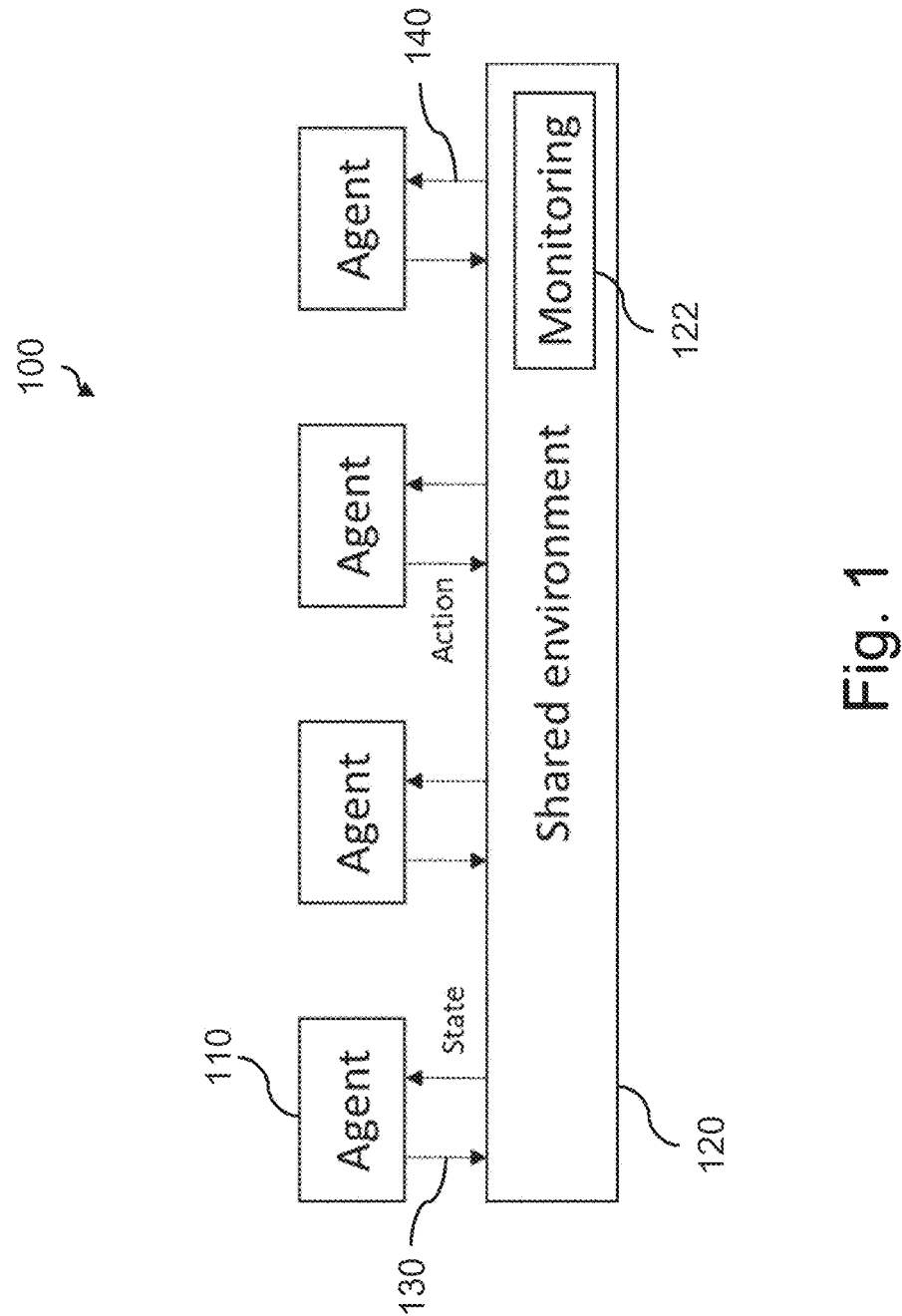
FIG. 1 is a schematic view illustrating the basic process of multiple agents interacting with a shared environment.

The project leading to this application has received funding from the European Union's Horizon 2020 research and innovation program under grant agreement No 871780.

In accordance with an embodiment, the present invention improves and further develops a method and an agent coordinator of the initially described type for detecting and managing conflicting interactions among a set of agents operating on a shared open radio environment in such a way that conflicting situations can be efficiently and reliably resolved, such as that the performance characteristic of the open radio environment is improved.

In accordance with another embodiment, the preset invention provides a computer-implemented method for detecting and managing conflicting interactions among a set of agents operating on a shared open radio environment, wherein the method comprises: evaluating the effects of monitored actions taken by the agents on one or more observed metrics, the actions taken by the agents being observed by a monitoring system of the open radio environment; using the monitored actions and information that is collected about the agents from the monitoring system to build a knowledge graph that represents the interactions between each agent of the set of agents with the open radio environment and between each of the agents; processing information extracted from the knowledge graph to estimate unknown and/or dynamic relationships among the agents; using the estimated relationships among the agents to detect conflicting situations between the agents; and enforcing a pre-defined coordination and/or control policy according to the estimated relationships among the agents to solve or mitigate the detected conflicting situations.

Furthermore, in accordance with another embodiment, the present invention provides an agent coordinator for detecting and managing conflicting interactions among a set of agents operating on a shared open radio environment, wherein the agent coordinator comprises one or more processors configured to evaluate the effects of monitored actions taken by the agents on one or more observed metrics, the actions taken by the agents being observed by a monitoring system of the open radio environment; use the monitored actions and information that is collected about the agents from the monitoring system to build a knowledge graph that represents the interactions between each agent of the set of agents with the open radio environment and between each of the agents, process information extracted from the knowledge graph to estimate unknown and/or dynamic relationships among the agents, use the estimated relationships among the agents to detect conflicting situations between the agents, and enforce a predefined coordination and/or control policy according to the estimated relationships among the agents to solve or mitigate the detected conflicting situations.

Embodiments of the present invention provide a method and a system to detect conflicting interactions among a set of agents operating in an agnostic way on a shared open radio environment, finally coordinating their decisions to minimize cross-interference and guarantee safe operation of the single entities and the platform itself. According to embodiments of the invention, an agent coordination entity may support heterogeneous agents (e.g. xApps) in open radio environments by estimating b the cross-impact of decision actions taken by multiple agents without detailed prior information on the internal processing of the running application. The agent coordination entity may be configured to solve/mitigate conflicting situations that may arise in the system due to agnostic operations of the shared radio environment by means of a feedback loop to the specific conflicting agents/xApps. According to embodiments, the method makes use of a knowledge graph, which is a relational graph that represents, in a dynamic manner, the level of interaction among different agents deployed within the platform.

According to an embodiment of the invention, the set of agents operating on the shared radio environment may include a number of xApps. In the context of the present disclosure, xApp refers to O-RAN's concept of x-applications, denoting logical entities that run arbitrary third-party applications with network and control capabilities onto the open platform through standardized interfaces. In this case, due to the arbitrary nature of the xApps, which may pursue different tasks with different objectives, conflict mitigation in accordance with embodiments of the present invention is particularly useful.

Embodiments of the present invention allow to control conflicting policies after initial admission (on-boarding) of (potentially conflicting) xApps into the O-RAN system, without prior information about the specific xApp decision logics. While some conflict avoidance policies known from prior art are enforced during the xApp on-boarding phase (admission and control) and assume prior-knowledge on the behavior of the specific application to be deployed, embodiments of the present invention focus on the run-time phase and already admitted xApps, by providing a methodology that detects and tries to solve/mitigate conflicts without requiring a detailed prior-knowledge of the internal xApp procedures. According to an embodiment, the controlling entity to solve/mitigate conflict may thus work in an online manner based on incoming xApp requests.

According to an embodiment of the present invention, the shared open radio environment may include a slicing-enabled open RAN platform, and the set of agents may include a number of agents that perform radio resource allocation decisions on the open RAN platform in an agnostic way. Since in such a scenario, agnostic agents perform operations on the platform (such as, e.g., bandwidth allocation) based on slices-specific metrics, being unaware of other agents' decisions and/or strategies, the conflict detection and mitigation scheme according to the present invention may be suitably applied to achieve proper and efficient operation of the O-RAN platform.

According to an embodiment of the present invention, the agent coordinator may comprise a relationship estimation entity that is configured to receive, from the monitoring system, monitoring information with respect to a set of observed metrics that each agent consumes and a set of actions performed by each agent. The relationship estimation entity may comprise one or more processors, which are configured, alone or in combination, to determine, based on the received information, for each agent the monitoring information that trigger decision changes with respect to actions taken by the respective agent and the resources the respective agent is acting on.

According to an embodiment of the present invention, the one or more processors of the relationship estimation entity may be further configured to map input node and edge features of the knowledge graph into a latent space, thereby obtaining a number of matrices of nodes and of edges of the knowledge graph. The relationship estimation entity may pass these matrices to a set of graph neural network, GNN, layers configured to iteratively perform convolution operations onto the embedded information as to derive relation patterns among the agents.

According to an embodiment of the present invention, the one or more processors of the relationship estimation entity may be further configured to determine, from a set of resources of the shared open radio environment, for each agent operating on the shared open radio environment, a subset of relevant resources based on monitoring the resources affected by each agent's actions.

According to an embodiment of the present invention, the one or more processors of the relationship estimation entity may be further configured to determine, from a set of monitoring information provided by the monitoring system of the shared open radio environment, for each agent operating on the shared open radio environment, a subset of relevant monitoring information by cross-correlating the actions taken by each of the agents and the monitored information.

According to an embodiment of the present invention, the agent coordinator may comprise a coordination logic that is configured to process, by means of a graph convolutional network, GNN, the knowledge graph and take decisions based on the predefined coordination policy.

According to an embodiment of the present invention, the actions taken by the agents may relate to the task of radio resource scheduling, selection of the transmission MCS (Modulation Coding Scheme), CPU allocation, bandwidth allocation, and/or traffic steering.

According to an embodiment of the present invention, the enforced control policies may include agent ordering, agent action control and notification, and/or agent action rejection.

According to an embodiment of the present invention, the collected information about the agents and the monitored actions taken by the agents may be used to dynamically update the knowledge graph. A continuous graph update allows to follow the system dynamics.

There are several ways how to design and further develop the teaching of the present invention in an advantageous way. To this end it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing State of the art solutions dealing with the coexistence of multiple applications running on a single shared environment range from a centralized optimization of the resource allocation, which however does not comply with the autonomous nature of xApp decisions (for reference, see Halabian, Hassan. "Distributed resource allocation optimization in 5G virtualized networks." *IEEE Journal on Selected Areas in Communications* 37.3 (2019): 627-642), to more advanced team learning techniques, where agents receive feedback from the platform that they can use to adapt their decisions and achieve better coexistence (for reference, see Han Zhang, Hao Zhou, and Melike Erol-Kantarci. "Team Learning-Based Resource Allocation for Open Radio Access Network (O-RAN)." 2022 *IEEE International Conference on Communications* (ICC)). While the latter solution does not alter the autonomy of agents' decisions, it is based on the assumption that agents will cooperate in reaching an equilibrium point, which might not hold due to the arbitrary nature of the xAPPs.

Embodiments of the present invention provide a method that exploits only the information crossing the interface provided to and coming from the xApp to estimate a level of interference that they could cause to each other, i.e., how decisions taken by an agent might affect other agents, not only in terms of impacting on the resource availability, but also in terms of performance variations as a different resource status may trigger deviations into specific action policies of some agents. According to embodiments of the invention, this information is then used to enforce coordination policies on the running xApps, as to minimize cross-interference or guarantee the correct platform operations. Differently from the state of the art, the solution according to embodiments of the invention does not require any prior information on the specific xApp, nor any cooperation among them.

As depicted in FIG. 1, in machine learning enabled scenarios 100, decision entities, often called agents 110, iteratively interact with a shared environment 120 pursuing the maximization of a utility function. Such interactions are basically shown at 130. The shared environment 120 comprises monitoring functionality 122 to inform agents 110 on its status in terms of some monitored metrics, as basically shown at 140.

The agents 110 may collect several system metrics, build a local state abstracting the overall system environment, and take decisions based on such information. A reward function may define the quality of the action, with respect to a pre-defined objective, and guide an overall learning procedure.

In the context of the present disclosure, scenarios are considered where multiple agents pursue heterogeneous objectives. In this context, agents may act as isolated entities without a proper coordination, while pursuing local objectives and operating on a shared environment.

Within these settings, the decision of an agent may influence the monitoring information of another agent, therefore impacting on its local state and potentially changing its future behavior and performances.

This aspect is particularly important in the context of mobile radio management, where Open-RAN (O-RAN) recently raised as a promising technology to deal with 5G (and beyond) complex radio management processes. O-RAN is a major carrier-led effort to define the next generation (virtual) radio access networks, (v)RANs, for multi-vendor deployments. It is aimed at disrupting the vRAN ecosystem by breaking vendors' lock-in and opening up a market that has been traditionally dominated by a small set of players (for reference, see A. Garcia-Saavedra and X. Costa-Pérez, "O-RAN: Disrupting the Virtualized RAN Ecosystem." in *IEEE Communications Standards Magazine*, vol. 5, no. 4, pp. 96-103, December 2021, doi: 10.1109/MCOMSTD.101.2000014).

Figure 2:
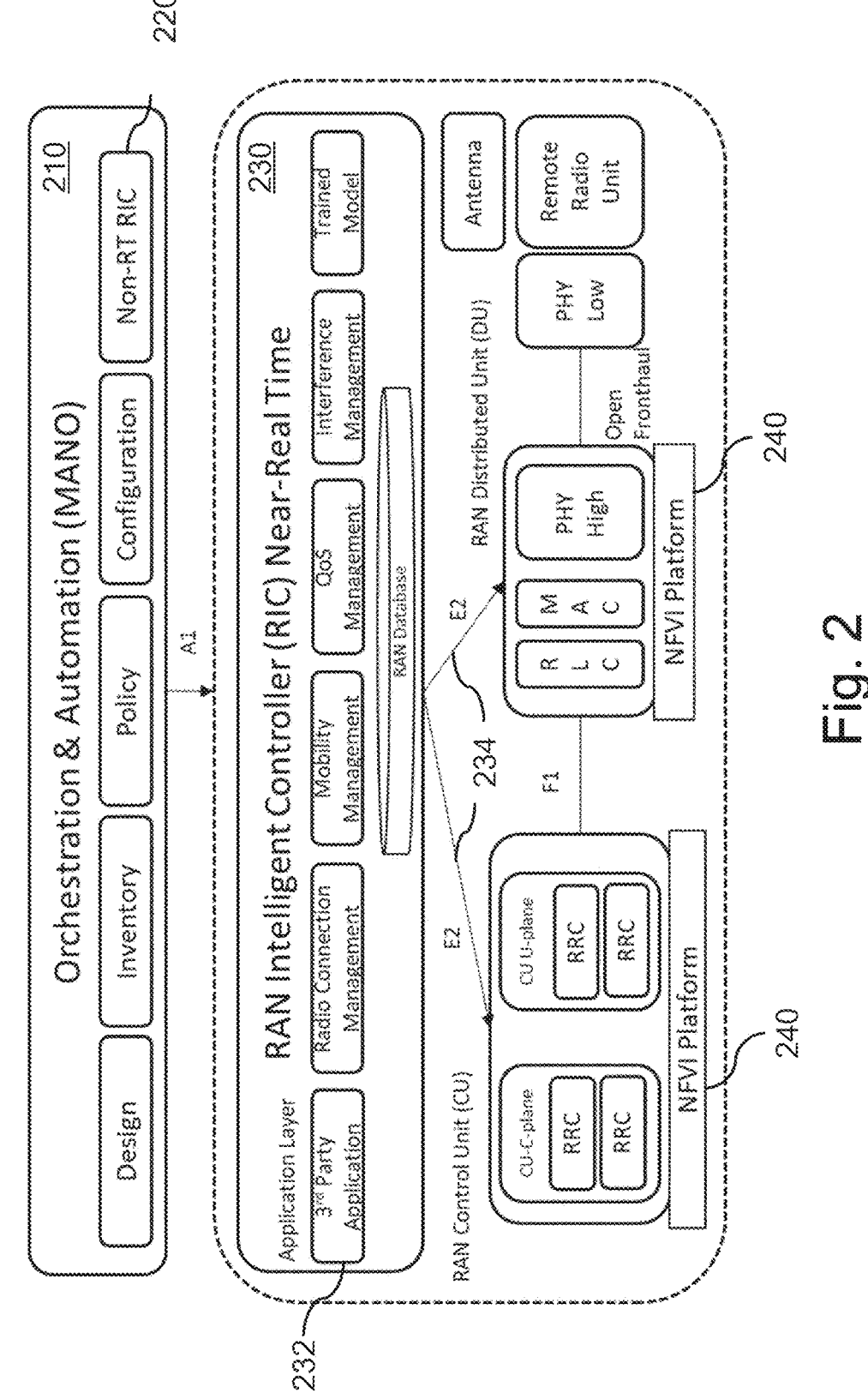
FIG. 2 is a schematic view illustrating the main building blocks of an ORAN architecture.

O-RAN provides a hierarchical architecture with open interfaces among the main building blocks, as depicted in FIG. 2. The main architectural components include:

Service Management and Orchestration (SMO/MANO) 210: consolidates several orchestration and management services for large-timescale RAN optimization, O-Cloud management and orchestration via the O2 interface, including resource discovery and update.

Non-RT RAN Intelligent Controller 220: This logical function resides within the SMO and provides the A1 interface to the Near-RT RIC 230. Its main goal is to support large timescale RAN optimization (seconds or minutes), including policy computation, ML model management (e.g., training), and other radio resource management functions within this timescale.

Near-RT RAN Intelligent Controller 230: It is a logical function that enables near-real-time optimization and control and data monitoring of O-CU (central unit) and O-DU (distributed unit) nodes in near-RT timescales (between 10 ms and 1 s). Its behavior is steered by the policies and assisted by models computed/trained by the non-RT RIC 220. It is particularly important for radio resource management (RRM), but near-RT RIC 230 also supports third-party applications (in particular so-called xApps 232).

O-Cloud/NFVI (Network Function Virtualization Infrastructure) Platform 240: O-RAN Alliance defines O-Cloud as a cloud computing platform comprised of a collection of physical infrastructure nodes that meet O-RAN requirements to host the relevant O-RAN functions, the supporting software components, and the appropriate management and orchestration functions.

This hierarchical architecture inherently enables three control loops, working at different time granularity, and pursuing different scopes:

Non-RT RIC 220 control loop: This control loop mainly targets slow and large-timescale operations, in the order of seconds or minutes.

Near-RT RIC control loop 232: This control loop targets sub-second timescale operation, e.g., those tasks related to policy enforcement or radio resource management operations.

O-DU scheduler control loop: This control loop targets real-time operation performing legacy radio operations.

Within the present disclosure, a focus is on the Near-RT RIC 230, as a logical function that enables near-real-time control and optimization of RAN elements and resources via fine-grained data collection and actions over an E2 interface 234.

Figure 3:
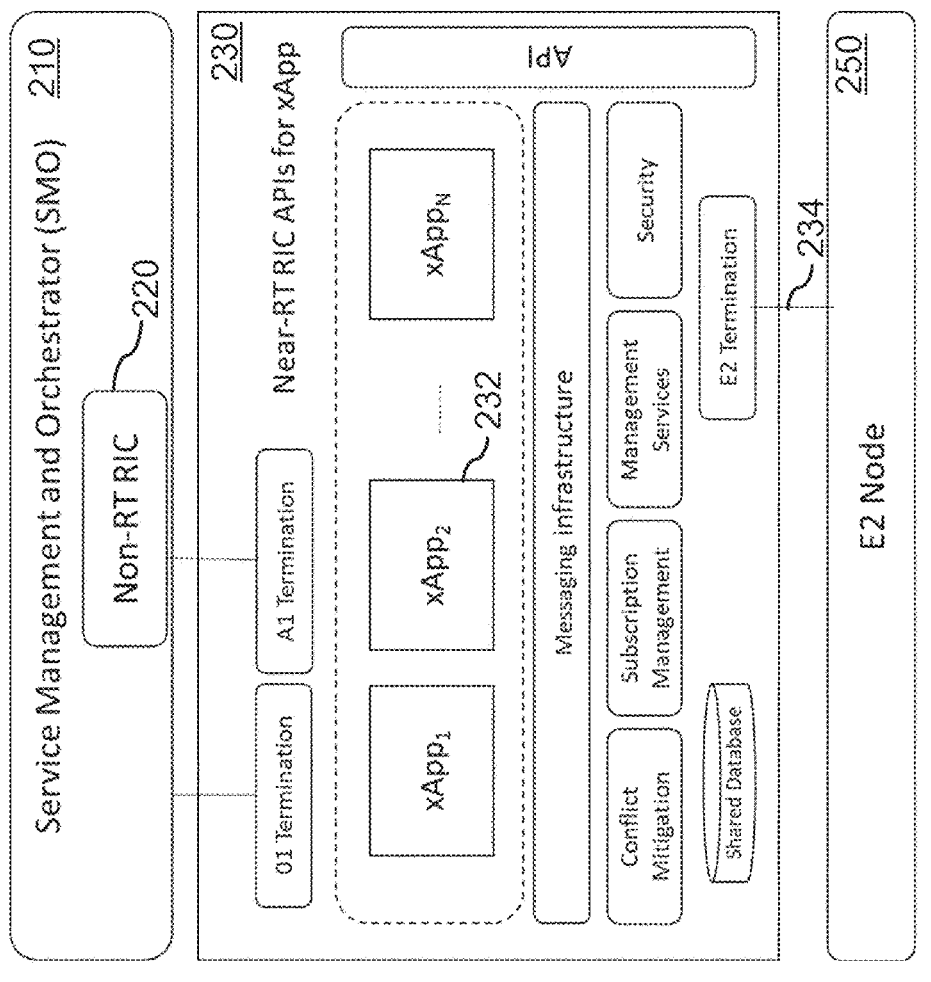
FIG. 3 is a schematic view illustrating the internal architecture of the Near-RT RIC of the ORAN architecture.

The internal architecture of the Near-RT RIC 230 is depicted in FIG. 3, including a number of xApps 232. Like reference numbers denote like or similar components and functions as in FIG. 2.

The xApp 232 is an application designed to run on the Near-RT RIC 230. Each xApp 232 is expected to consist of one or more microservices dealing with well-defined radio management tasks. At the point of on-boarding into the platform, a microservice will identify which data it consumes and which data it provides. Importantly, these applications are independent of the Near-RT RIC 230, which acts as software hosting platform, and may be provided by any third-party entity, thereby opening a traditionally locked-in ecosystem to external business entities.

The E2 interface 234 enables a direct communication and association between the xApp 232 and the underlying RAN functionalities, generally hosted by E2 nodes 250, as well as the collection of monitoring data.

Different xAPPs may use heterogeneous frameworks and different learning parameters, which makes it hard to actively track their behavior in a scalable manner. Taking as example the scenario described in Han Zhang, Hao Zhou, and Melike Erol-Kantarci. "Team Learning-Based Resource Allocation for Open Radio Access Network (O-RAN)." 2022 *IEEE International Conference on Communications (ICC)*), which is hereby incorporated herein by reference, when an xApp acts, it does not take into account the actions of other xApps. The selected action may be the optimal choice in its own view, but the performance of other xApps may be affected. For example, xApp A may assign a high transmission power to a resource block group (RBG). At the same time, xApp B may reassign this RBG to a user with a small traffic load. When xApp A and xApp B take actions together, the high transmission power does not bring high throughput as expected by xApp A, but increases the power consumption and generates more interference.

This situation further exacerbates when considering xApps concurrently dealing with different layers of the protocol stack, over distributed E2 nodes' platforms, and even across different technological domains, e.g., radio and virtualized resource management (e.g., as described in Jose Ayala-Romero et al., "vrAIn: Deep Learning based Orchestration for Computing and Radio Resources in vRANs.", *IEEE Transactions on Mobile Computing,* 2020). This is exemplarily depicted in FIG. 4, where xApp1 interacts with the RRC (Radio Resource Control) 412 of the RAN Control Unit 410 of E2 node 250, xApp2 interacts with the MAC layer 422 of the RAN Distributed Unit 420, and xApp3 interacts directly with the underlying NFVI platform 240.

It is important to point out that due to independent development and agnostic interactions, problems may arise due to overlapping or conflicting xApps requests coming from multiple xApps. This can lead to troublesome situations as each application will typically try to optimize its local objective (based on some specific use-case dependent metric). Embodiments of the present invention provide techniques and equipment that aim at conflict mitigation to resolve any conflicting xApps actions.

In this context, embodiments of the present invention provide a system for conflict mitigation including a dedicated entity, denoted agent coordinator herein, to deal with this problem in an autonomous way and without requiring information on the application(s) run by the hosted xApps. The agent coordinator may be realized as a logical entity and may be in charge of estimating the relationships among xApps, and the cross-influence that one action may introduce onto another xApp. Additionally, according to an embodiment, the agent coordinator may also be in charge of devising control policies to mitigate, or even solve, conflicting scenarios by means of control actions that may include xApp ordering, action control and notification, and/or action rejection.

Figure 4:
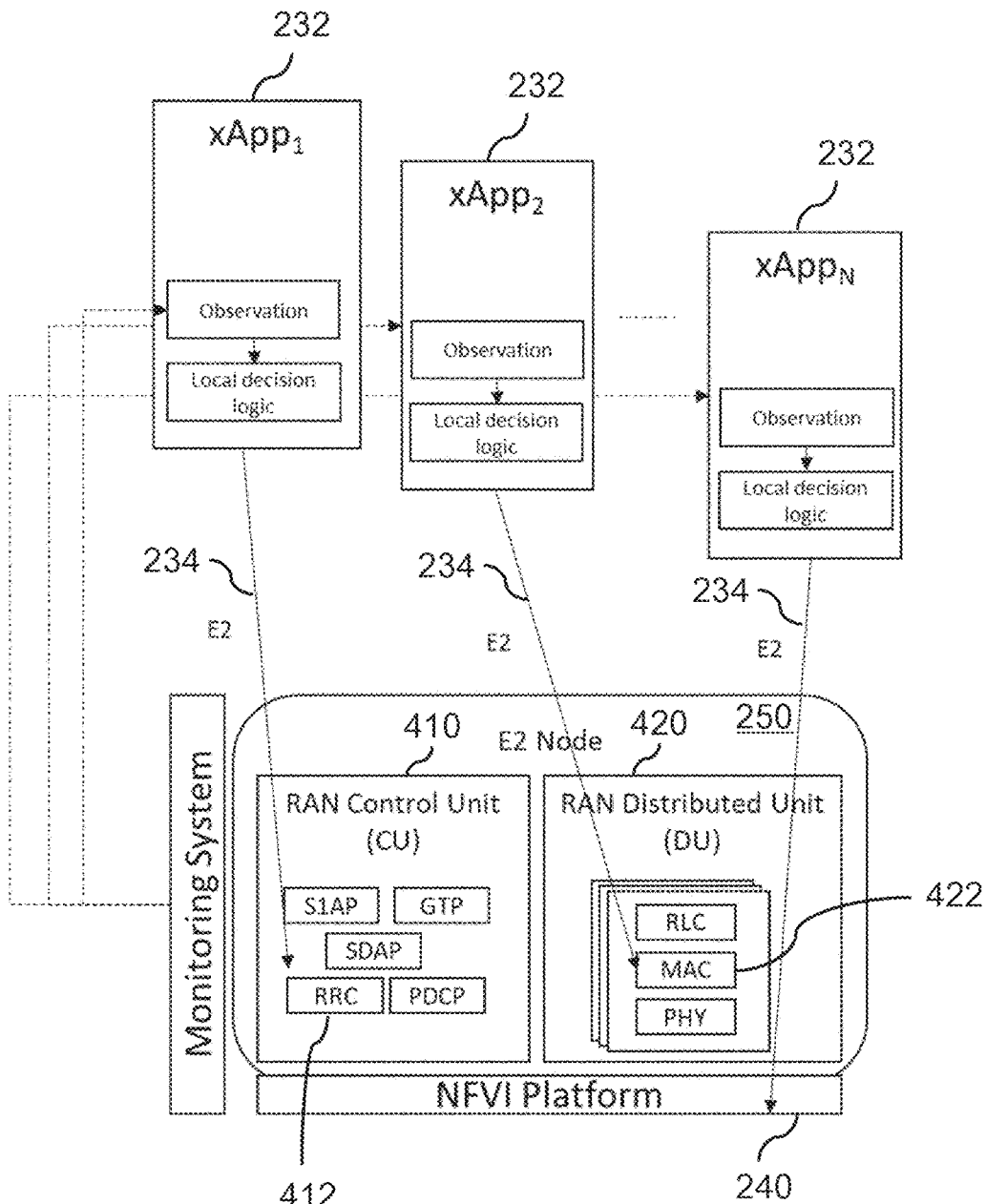
FIG. 4 is a schematic view illustrating different xApps concurrently taking actions on different protocol layers and domains.
Figure 5:
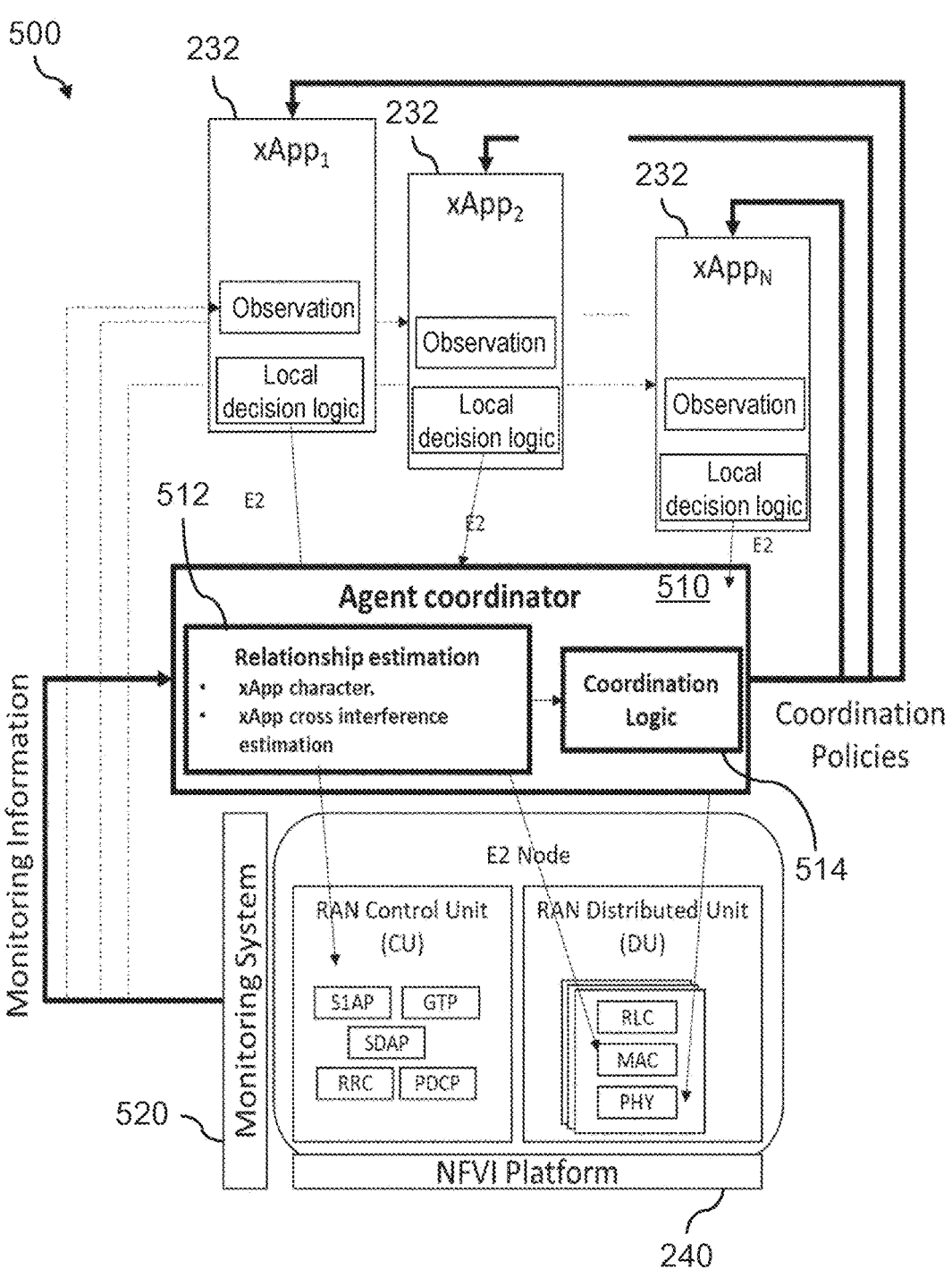
FIG. 5 is a schematic view illustrating integration of an agent coordinator entity for ORAN in accordance with an embodiment of the present invention.

Based on the scenario shown in FIG. 4, FIG. 5 shows the scenario enhanced with an agent coordinator 510 in accordance with an embodiment of the present invention.

The agent coordinator 510 may interact with the O-RAN environment 500 as depicted in FIG. 5. In particular, the agent coordinator 510 may be configured to receive monitoring information from a monitoring system 520 of the O-RAN environment 500 that observes a set of predefined or configurable monitoring metrics. According to the embodiment illustrated in FIG. 5, the agent coordinator 510 may include two modules, namely a relationship estimation module 512 and a coordination logic 514, which are briefly described in the following.

Relationship estimation module 512: Embodiments of the present invention rely on graphs to abstract complex relationships characterizing a respective scenario of interest into simpler representations, which can be used to solve a cross-interference problem with the help of the relationship estimation module 512 as follows:

The module 512 may take as input a set of monitoring metrics that each xApp 232 consumes and a set of actions performed by each xApp 232. More specifically, the input information may include information collected by the monitoring system 520 from the underlying platform 240. This may include multiple (potentially heterogeneous) metrics in a time series format, taken from hardware and software modules composing the open radio environment (e.g., latency, SNR, communication buffer length, number of connected users, CPU utilization, etc.). The information from each metric, e.g., their value in a certain time instant, may then be transformed into a graph to estimate the inter-metric relationship. In other words, the module 512 may abstract the information contained in the time series into a set of nodes, edges, and attributes, as an effective way to build a knowledge graph, dubbed as relational graph, representing the underlying system. As such, the module 512 is configured to obtain a representation of the interaction of each xApp with the shared environment and between each other. The same monitored data is used to dynamically update the relational graph to follow the system variations.

According to an embodiment, the relationship estimation module 512 may be configured to perform the following steps to build the relational graph:

1. xApp characterization: This step characterizes each running xApp 232 based on the monitored information.
2. xApp cross interference estimation: This step processes the information extracted from the previous steps to relate different xApps 232 and reveal potential interference.

In the following, the above mentioned steps together with potential implementations will be described in some more detail.

xApp characterization: The xApp characterization step processes the monitored data and the actions taken by each of the xApps 232 to obtain a representation of the monitored information which are relevant to it. For instance, it may be evaluated which monitored information triggers decision changes, and which are the resources the respective xApp 232 is acting on.

It is recalled that the set of monitoring information collected by each xApp 232 is an information that is available since the on-boarding phase of each xApp 232. It is easy to assume that part of the monitoring information declared in the on-boarding phase presents larger impact on the decisions of the agents, while others might be even unused. However, due to privacy constraints, it is not possible to gain information about specific inter-xApp processing steps, making it difficult to profile the single instances relying only on the on-boarding phase.

According to an embodiment of the invention, $\mathcal{M} = \{m_1, \ldots, m_M\}$ is defined as the set of monitoring information that the platform 240 can provide to the xApps 232. Based on the monitored information and the running application, each xApp 232 takes actions over a set of (shared) resources $\mathcal{R} = \{r_1, \ldots, r_R\}$. Depending on the specific task, only a subset of $\mathcal{M}$ and $\mathcal{R}$ might be relevant for a specific xApp A, namely $\mathcal{M}_A$ and $\mathcal{R}_A$. Examples of typical tasks in the RAN domain include radio resource scheduling, selection of the transmission MCS (Modulation Coding Scheme), CPU allocation, bandwidth allocation, traffic steering, etc.

Given an xApp A, the subset $\mathcal{R}_A$ of relevant resources can be estimated by directly monitoring its control actions, i.e. observing the resources affected by its decisions. The subset of $\mathcal{M}_A$ can be obtained by cross-correlating the actions of the xApp A and the monitored information to reveal the metrics that trigger control operation for the xApp A. In a similar way, actions taken by an xApp A can affect metrics which are not directly monitored by it. Thus, by observing the changes of monitored information happening after a control operation, the relationship estimation module 512 can infer how decisions affect the system status. This information can be represented as the set $\mathcal{A}_A = \{a_1, \ldots, a_R\}$ of affected metrics, which may also include the ones not directly monitored by the xApp A. Another way to obtain this information is to observe relationships between metrics by direct cross correlation among them.

Figure 6:
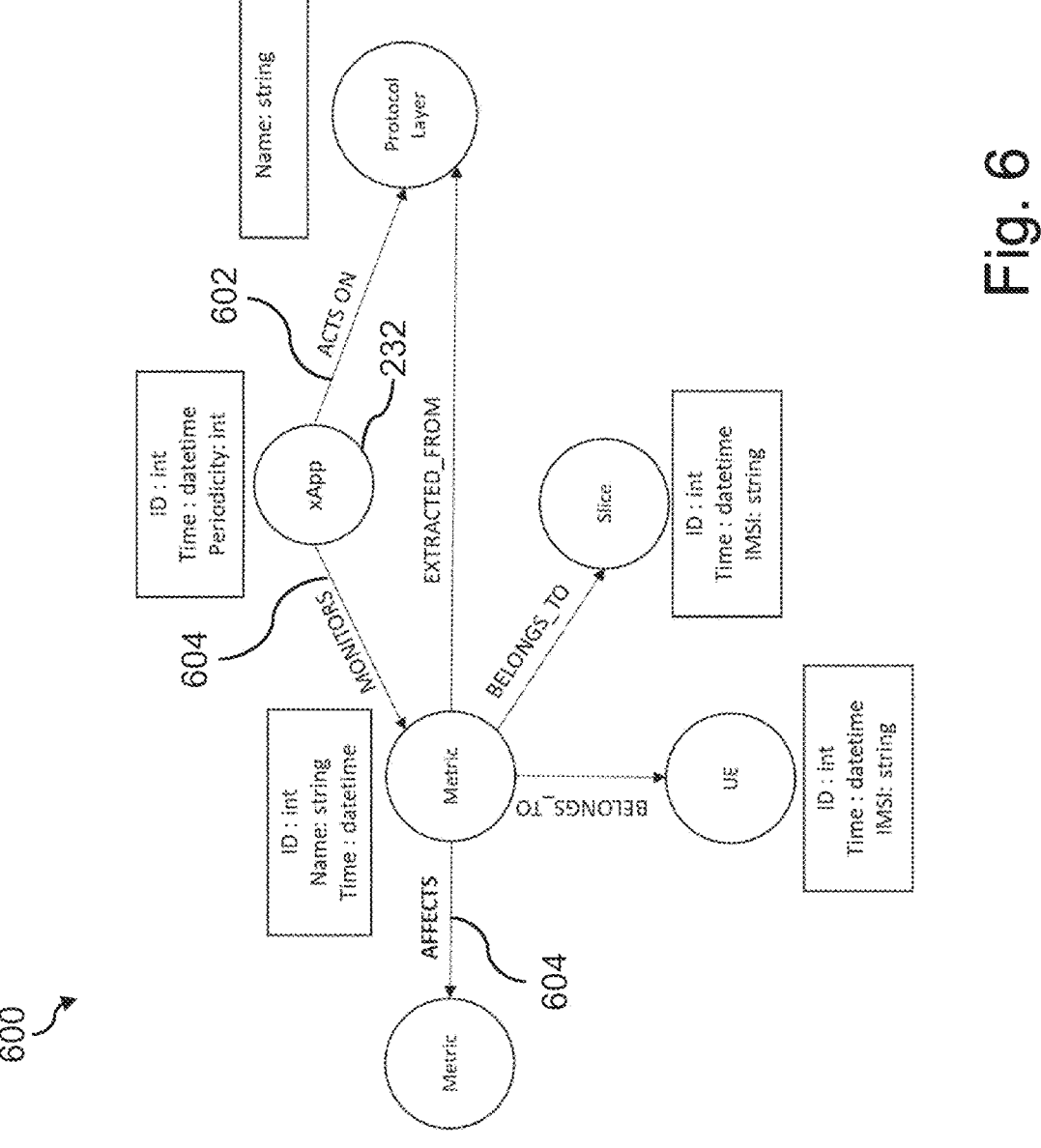
FIG. 6 is a schematic view illustrating a data model of a characterization of an xApp in accordance with an embodiment of the present invention.

FIG. 6 illustrates an example data model 600 in accordance with an embodiment of the present invention, with a characterization of an xApp 232 as obtained by the relationship estimation module 512, the subsets of $\mathcal{M}$ and $\mathcal{R}$ which are relevant for the running application, i.e., it builds the 'ACTS ON' and 'MONITORS' edges 602, 604 of the data model 600, while the 'AFFECTS' edge 606 represents the relationships among metrics in $\mathcal{A}$.

The xApp characterization step as described above may be repeated for all the xApps 232 hosted by the platform, and may be the input information used to build a relationship graph providing the level of interaction between xApps 232 in the next operational step. This information may be periodically updated in order to compensate for the underlying system dynamicity.

xApp cross-interference estimation: As already mentioned above, the relationship estimation module 512 processes the information extracted from the previous step to relate different xApps 232 and revealed potential interference among them.

Figure 7:
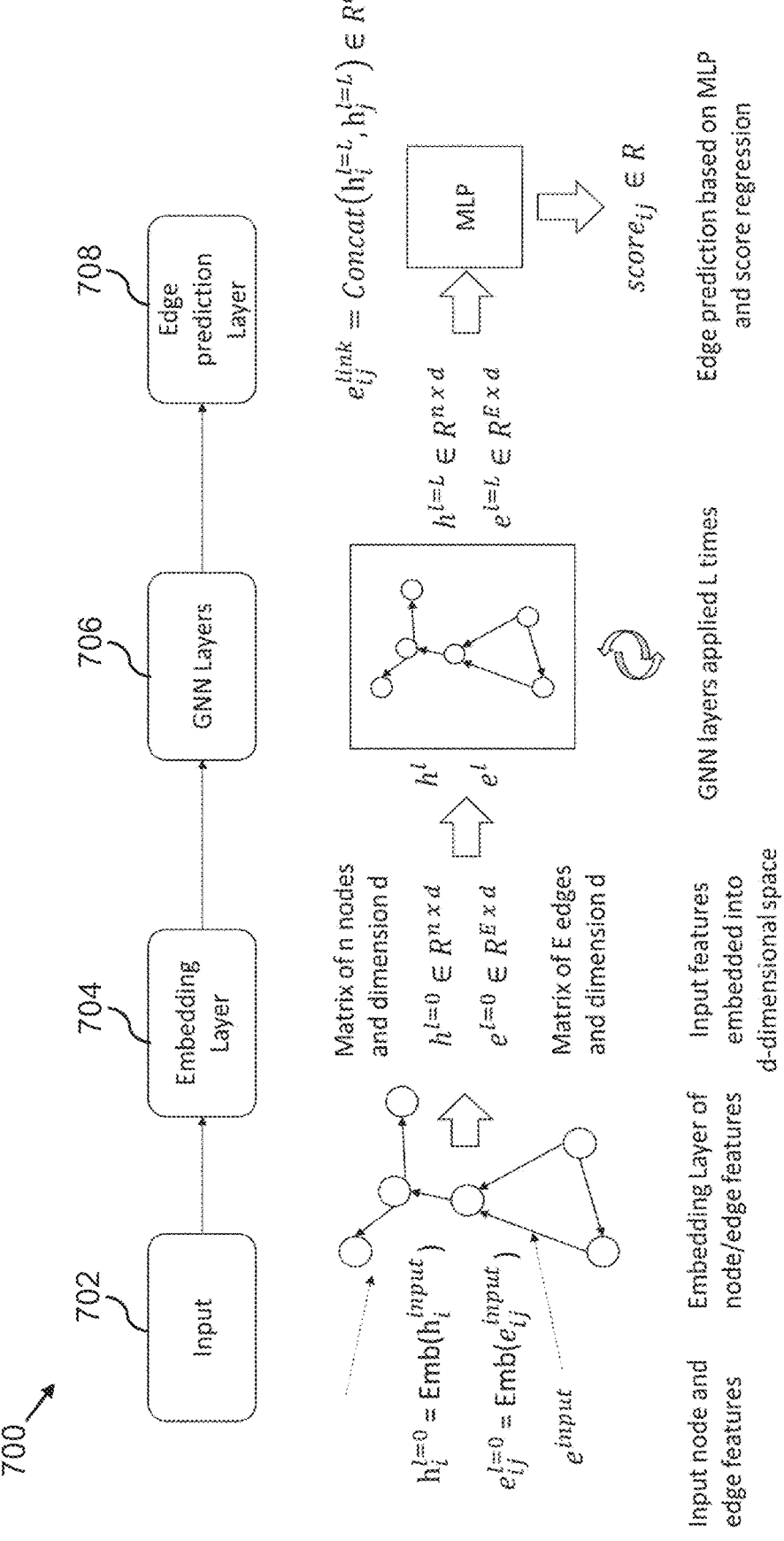
FIG. 7 is a schematic view illustrating a processing pipeline for relationship estimation between xApps in accordance with an embodiment of the present invention.

FIG. 7 depicts an example pipeline 700 for relationship estimation between xApps 232 in accordance with an embodiment of the present invention. The illustrated pipeline 700 involves four steps or layers, including input graph definition 702, embedding of input node and edge features 704, a series of Graph Neural Network (GNN) processing steps 706, and a final edge prediction layer 706.

According to embodiments of the invention, state-of-the-art methods, e.g., as disclosed in Z. Gao et al.: "edge2vec: Representation learning using edge semantics for biomedical knowledge discovery", in *BMC Bioinformatics* 20, 306 (2019), https://doi.org/10.1186/s12859-019-2914-2, which is hereby incorporated herein by reference, may be used to exploit known information to estimate unknown node relationships, in a supervised manner.

According to the example pipeline 700 illustrated in FIG. 7, the input data 702 include raw input node and edge features. These features pass through the embedding process 704, which maps the features into a latent space with a finite number d of dimensions. The number d may be a configurable parameter that is determined based on the available data and on the desired performance. In general, larger d values (i.e. a higher dimensional latent space) would allow for a better characterization of the node relationships, but implies a higher computational complexity. The output of this process can be mapped into multidimensional matrices (2D in the example scenario discussed herein) with rows representing different edges/nodes and columns representing different embedded features.

The obtained matrices may be passed to the following GNN layers 706. In this step, the multidimensional input passes through a set of GNNs, which iteratively perform convolution operations onto the embedded information as to derive relation patterns. Several GNN options are available in the state-of-the-art. For example, the solution described in T. N. Kipf and M. Welling, "Semi-supervised classification with graph convolutional networks," in ICLR, 2017, which is hereby incorporated herein by reference, may be used.

Figure 8:
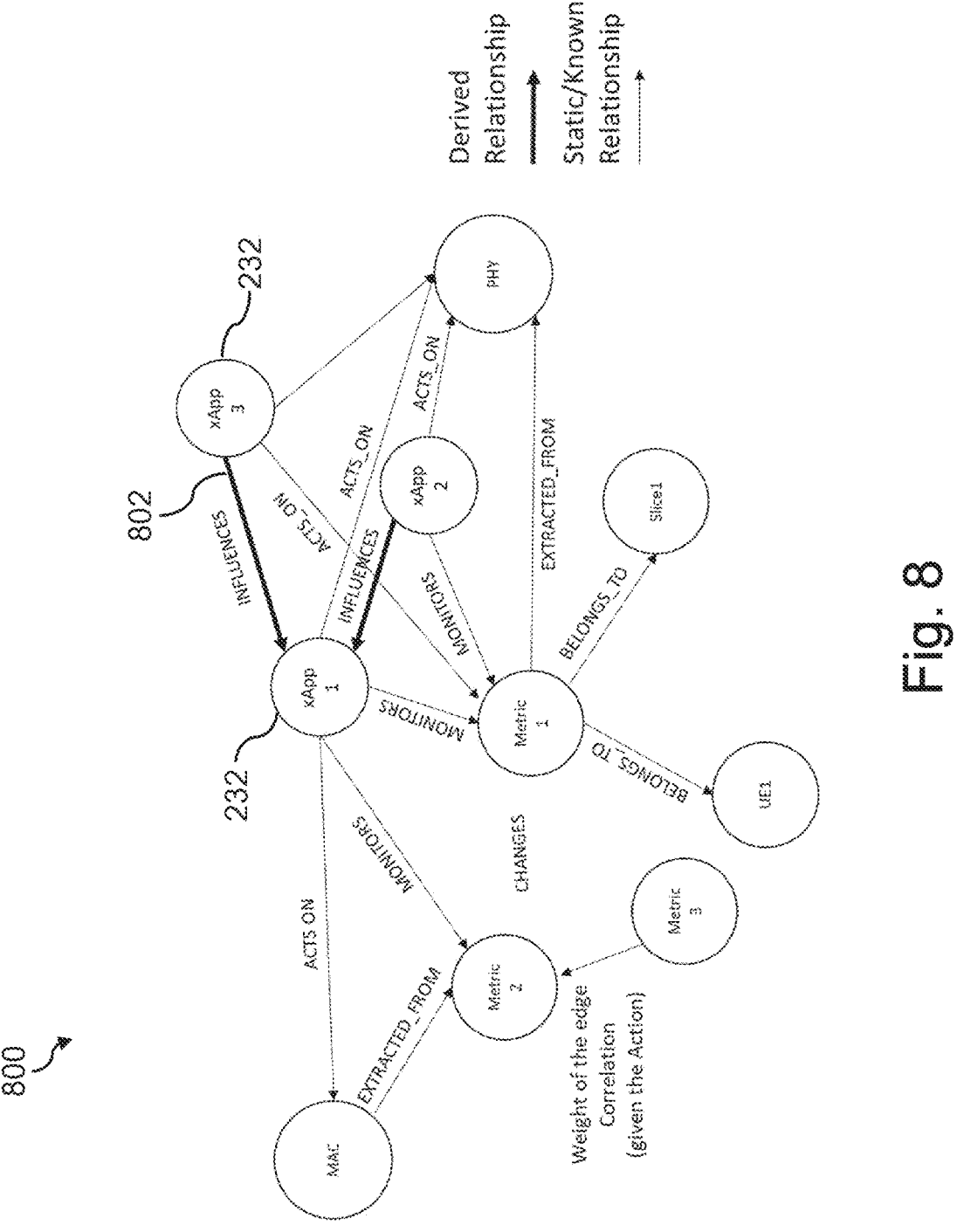
FIG. 8 is a schematic view illustrating a relational graph with target edges in accordance with an embodiment of the present invention.

Finally, the pipeline 700 includes a last edge prediction layer 708 that may be configured to exploit a Multi-Layer Perceptron (MLP) to provide an estimation of the relationship encompassing the different nodes. Within the context of the present disclosure, the MLP may translate into providing a weight, or a score, to the edges connecting different xApps 232. As is shown in the exemplary relational graph 800 illustrated in FIG. 8, the target edges connecting different xApps 232 are illustrated as INFLUENCES edges 802. The stronger the influence between two xApps 232, the higher will be the weight or score associated with the respective INFLUENCES edge 802.

The obtained relational graph 800, hereinafter denoted G, can be mathematically represented by means of a set of vertices V, a set of edges E, and an adjacent matrix A modeling the interaction among vertices, i.e., G=(V, E, A). Additionally, each node and edge is associated with a set of features $h_i$ and $e_{ij}$, respectively, which characterize the node type and the edge type, i.e., to distinguish between application, metric, and resource nodes.

Coordination Logic Entity 514: As illustrated in FIG. 5, this module 514 takes as input the updated graph information, built by the relationship estimation module 512 as described above, and defines control policies to be adopted.

There are multiple ways to address this problem once the relational graph 800 has been defined. According to an embodiment of the invention, the coordination logic entity 514 may be implemented by means of a Graph Convolutional Network that processes the relational graph 600 and takes decisions based on a desired coordination policy. For example, the GNN could prioritize the decision of the agents to minimize the overall level of interaction, or define subsets of non-interfering agents allowed to simultaneously take decisions not impact on each other.

Subsequently, a set of colliding xApps 232 can be identified as a sub-graph G'∈G. Within this set of nodes, different actions can take place according to the platform owner policy. A non-exhaustive list of possible control policy on colliding xApps 232 according to embodiment of the present invention includes:

colliding xApps 232 could be asked to refrain from taking actions within a given time period. This back-off procedure implies the sending of control signaling messages to the involved xApps 232.

xApps ranking procedures could take place among colliding xApps 232 according to specific platform-owner policies, or other metrics such as node centrality, node degree, etc., leaving at the definition of an ordered sequence of xApps.

The set of edges connecting conflicting xApps 232 in G' defines a directed graph, which can be traversed with an order. This, however, maps with the well-known "Travelling sales" problem in combinatorial optimization, which has been proven to be NP-Hard.

In case of conflicting policies, the agent coordinator 510 can take actions on the conflicting xApps 232. A possibility in accordance with an embodiment of the present invention is to prioritize the xApps decisions to minimize conflicts, e.g., if an xApp A interferes on another xApp B, but not vice versa, the xApp B can be scheduled to take decisions before the xApp A and avoid the conflict. Moreover, following the xApp paradigm, the coordination logic of the agent coordinator 510 may be configured to notify the interfering xApps 232 with a control message indicating that their state may have been compromised by other agents. This would help the agents to pose less confidence on these states, therefore favoring the correct learning procedure in continuous-learning settings.

So far, the present invention has been mainly described with respect to the detection and mitigation of conflicting xApps in O-RAN deployments. However, the present invention can be likewise deployed in network slicing scenarios where multiple agents perform radio-resource allocation decisions on a slicing-enabled Open RAN platform. Within these settings, agnostic agents perform bandwidth allocation, and/or physical resource blocks (PRBs) allocation, based on slice-specific metrics, being unaware of other agents decisions and/or strategies.

It is easy to assert that within these settings agent coordination is crucial to ensure the correct system operational status as well as to guarantee the satisfaction of slice specific KPIs, e.g., latency or throughput. Moreover, from a scheduling perspective, the order by which agents take actions is a key-parameter that should be carefully configured by the platform owner.

In this scenario, the solution according to the present invention would be able to abstract the relationship that characterizes the different agents, and coordinate/prioritize them according to a coordination logic that would ensure, for example, a fair access to resources, depending on a platform-based target control policy.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for detecting and managing conflicting interactions among a set of agents operating on a shared open radio environment, the method comprising:

evaluating effects of monitored actions taken by the agents on one or more observed metrics, the actions taken by the agents being observed by a monitoring system of the shared open radio environment;

using the monitored actions and information that is collected about the agents from the monitoring system to build a knowledge graph that represents the interactions between each agent of the set of agents with the shared open radio environment and between the agents;

processing information extracted from the knowledge graph to estimate relationships among the agents;

using the estimated relationships among the agents to detect conflicting situations between the agents; and enforcing a predefined coordination and/or control policy according to the estimated relationships among the agents to solve or mitigate the detected conflicting situations.

2. The method according to claim 1, wherein the set of agents includes a number of xApps running on the shared open radio environment.

3. The method according to claim 1, wherein the shared open radio environment includes a slicing-enabled open RAN platform, and wherein the set of agents includes a number of agents performing radio resource allocation decisions on the open RAN platform in an agnostic way.

4. The method according to claim 1, further comprising:
   determining, from a set of resources of the shared open radio environment, for each agent operating on the shared open radio environment, a subset of relevant resources based on monitoring resources affected by actions of each agent.

5. The method according to claim 1, wherein processing information extracted from the knowledge graph to estimate the relationships among the agents comprises:
   mapping input node and edge features of the knowledge graph into a latent d-dimensional space, thereby obtaining a number of matrices, and
   passing the obtained number of matrices to a set of graph neural network (GNN) layers configured to iteratively perform convolution operations onto embedded information so as to derive relation patterns among the agents.

6. The method according to claim 1, further comprising:
   determining, from a set of monitoring information provided by the monitoring system of the shared open radio environment, for each agent operating on the shared open radio environment, a subset of relevant monitoring information by cross-correlating the actions taken by each of the agents and the monitored information.

7. The method according to claim 1, wherein actions taken by the agents relate to a task of radio resource scheduling, selection of the transmission MCS (Modulation Coding Scheme), CPU allocation, bandwidth allocation, and/or traffic steering.

8. The method according to claim 1, wherein the enforced control policy includes agent ordering, agent action control and notification, and/or agent action rejection.

9. The method according to claim 1, further comprising using the collected information about the agents and the monitored actions taken by the agents to dynamically update the knowledge graph.

10. An agent coordinator for detecting and managing conflicting interactions among a set of agents operating on a shared open radio environment, the coordinator comprising one or more processors configured to:
   evaluate effects of monitored actions taken by the agents on one or more observed metrics, the actions taken by the agents being observed by a monitoring system of the shared open radio environment;
   use the monitored actions and information that is collected about the agents from the monitoring system to build a knowledge graph that represents the interactions between each agent of the set of agents with the shared open radio environment and between each of the agents;
process information extracted from the knowledge graph to estimate relationships among the agents,
use the estimated relationships among the agents to detect conflicting situations between the agents, and
enforce a predefined coordination and/or control policy according to the estimated relationships among the agents to solve or mitigate the detected conflicting situations.

11. The coordinator according to claim 10, further comprising a relationship estimation entity configured to:
   receive, from the monitoring system, monitoring information with respect to a set of observed metrics that each agent consumes and a set of actions performed by each agent, and
   based on the received information, determine for each agent monitoring information that trigger decision changes with respect to actions taken by the respective agent and resources the respective agent is acting on.

12. The coordinator according to claim 11, wherein the relationship estimation entity is further configured to:
   map input node and edge features of the knowledge graph into a latent d-dimensional space, thereby obtaining a number of matrices, and
   pass the obtained number of matrices to a set of graph neural network (GNN) layers configured to iteratively perform convolution operations onto embedded information so as to derive relation patterns among the agents.

13. The coordinator according to claim 11, wherein the relationship estimation entity is further configured to
   determine, from a set of resources of the shared open radio environment, for each agent operating on the shared open radio environment, a subset of relevant resources based on monitoring the resources affected by actions of each agent.

14. The coordinator according to claim 11, wherein the relationship estimation entity is further configured to
   determine, from a set of monitoring information provided by the monitoring system of the shared open radio environment, for each agent operating on the shared open radio environment, a subset of relevant monitoring information by cross-correlating the actions taken by each of the agents and the monitored information.

15. The coordinator according to claim 10, further comprising a coordination logic configured to process, using a graph convolutional network (GNN), the knowledge graph and take decisions based on the predefined coordination and/or control policy.

* * * * *